United States Patent
I et al.

(10) Patent No.: US 7,597,338 B2
(45) Date of Patent: Oct. 6, 2009

(54) BICYCLE FRAME WITH MULTIPLE LAYER TUBE

(75) Inventors: Simon I, Dajia Town (TW); Kun-Hsi Wang, Da-an Shiang (TW)

(73) Assignee: Giant Manufacturing Co., Ltd. (TW)

( * ) Notice: Subject to any disclaimer, the term of this patent is extended or adjusted under 35 U.S.C. 154(b) by 350 days.

(21) Appl. No.: 11/213,272

(22) Filed: Aug. 26, 2005

(65) Prior Publication Data
US 2006/0108768 A1    May 25, 2006

(51) Int. Cl.
B62K 3/00    (2006.01)
B62K 19/00   (2006.01)
(52) U.S. Cl. .................... 280/281.1; 280/274
(58) Field of Classification Search ......... 280/274–275, 280/281.1, 282–286, 288.2, 288.3
See application file for complete search history.

(56) References Cited

U.S. PATENT DOCUMENTS

| | | | |
|---|---|---|---|
| 3,966,230 A | | 6/1976 | Nicol |
| 4,047,731 A | | 9/1977 | VanAuken |
| 4,437,679 A | * | 3/1984 | Campagnolo ............ 280/281.1 |
| 4,493,749 A | | 1/1985 | Brezina |
| 4,541,649 A | | 9/1985 | Grunfeld |
| 4,856,800 A | | 8/1989 | Hashimoto et al. |
| 4,900,049 A | | 2/1990 | Tseng |
| 4,900,050 A | | 2/1990 | Bishop et al. |
| 4,902,160 A | | 2/1990 | Jeng |
| 5,019,312 A | * | 5/1991 | Bishop ........................ 264/152 |
| 5,078,417 A | * | 1/1992 | Mouritsen ................... 280/280 |
| 5,116,071 A | | 5/1992 | Calfee |
| 5,122,210 A | | 6/1992 | Kubomura et al. |
| 5,160,682 A | * | 11/1992 | Calfee ........................ 264/161 |
| 5,261,991 A | * | 11/1993 | Zackrisson et al. .......... 156/294 |
| 5,271,784 A | | 12/1993 | Chen et al. |
| 5,318,819 A | * | 6/1994 | Pai ............................ 428/71 |
| 5,346,237 A | | 9/1994 | Wang |
| 5,364,115 A | | 11/1994 | Klein et al. |
| RE35,335 E | | 9/1996 | Calfee |
| 5,613,794 A | | 3/1997 | Isaac et al. |

(Continued)

FOREIGN PATENT DOCUMENTS

EP    0 491 363    6/1992

(Continued)

OTHER PUBLICATIONS

Schroeder, et al., "Taking the Witchcraft Out of Advanced Composite Bicycle Frames, Design, Materials, Fabrication and Competitive Analysis," Specialized Bicycle Components v.1.4.1, revised Jan. 2005, 14 pages.

(Continued)

*Primary Examiner*—Lesley D Morris
*Assistant Examiner*—Marc A Scharich
(74) *Attorney, Agent, or Firm*—Vierra Magen Marcus & DeNiro LLP

(57) ABSTRACT

A bicycle frame is disclosed that includes a set of tubes connected together. At least a portion of one of the tubes comprises at least three layers of materials. For example, in one embodiment, the seat tube includes an inner layer of carbon fiber, a middle layer of aluminum (or other metal), and an outside layer of carbon fiber.

29 Claims, 7 Drawing Sheets

U.S. PATENT DOCUMENTS

| | | | |
|---|---|---|---|
| 5,762,352 A * | 6/1998 | Lee | 280/280 |
| 6,168,179 B1 * | 1/2001 | Yu | 280/274 |
| 6,213,488 B1 * | 4/2001 | Filice et al. | 280/281.1 |
| 6,761,187 B1 * | 7/2004 | Zoellner | 138/89 |
| 6,994,367 B2 * | 2/2006 | Mock et al. | 280/288.1 |
| 2005/0006872 A1 | 1/2005 | Mock et al. | |

FOREIGN PATENT DOCUMENTS

| | | |
|---|---|---|
| EP | 0 587 927 | 3/1994 |
| FR | 2 528 002 | 7/1982 |
| FR | 2 702 730 | 3/1993 |
| WO | WO 8908039 | 9/1989 |

OTHER PUBLICATIONS

Giant Bicycle Supplement, Sep. 2004, 60 pages.

* cited by examiner

BICYCLE FRAME WITH MULTIPLE LAYER TUBE

BACKGROUND

1. Field of the Invention

The technology described herein relates to bicycle frames.

2. Description of the Related Art

Historically, bicycle frames have been made from hollow metal tubes. These tubes are joined at their ends to form a frame upon which the various other components can be mounted. The metal tubes have been joined to one another by means of heavy lugs, braces or sleeves and held in place by welding, soldering, brazing or the like.

Recent advances in material sciences have made it possible to construct frames using lightweight non-metallic composite materials, such as carbon fiber. Carbon fiber materials provide the necessary strength and shock absorption for high performance cycling. The use of carbon fiber materials in bicycle frames has made it possible to reduce the weight of bicycles, which also improves performance.

Despite the advantages of lightweight non-metallic composite materials, such as carbon fiber, some riders still prefer the metal frames because metal provides stiffness and good power transmission.

To balance the advantages of metal frames with the advantages of lightweight non-metallic composite materials, some bicycle frames have been made from metal and non-metallic composite materials. For example, some of the tubes, lugs, or braces of the bicycle frame will made of metal while other tubes, lugs, or braces of the bicycle frame will made of non-metallic composite materials.

One example of such a bicycle frame is the Tarmac E5 frame from Specialized Bicycle Components, Inc. of Morgan Hill, Calif. The frame of the Tarmac E5 includes a head tube, a down tube, a bottom bracket, a lower portion of the seat tube, and chain stays that form an aluminum alloy undercarriage. The top tube, seat stays, and upper portion of the seat tube form a monocoque carbon fiber structure. The connection points on the alloy undercarriage are co-molded with the monocoque carbon fiber structure. Thus, the bottom portion of the seat tube is made of aluminum alloy while the top portion of the seat tube is made of carbon fiber. Where the bottom portion of the seat tube joins the top portion, a carbon fiber laminate layer surrounds the outside of the seat tube (including surrounding a portion of the aluminum tube) and another carbon fiber layer lines the inside of the seat tube (including lining that same portion of the aluminum tube). Although this frame combines aluminum and carbon fiber, the frame is not stiff enough to provide optimal power efficiency and corner acceleration.

As the sport of bicycling increases in popularity, there is a demand for better performing bicycle frames.

SUMMARY

A bicycle frame is disclosed that includes a set of tubes connected together. At least a portion of a first tube comprises at least three distinct layers of materials.

In one embodiment, at least a majority of the length of the first tube includes at least two of the three layers of materials.

One embodiment of the bicycle frame includes a seat tube, a front support, and a cross support connected to the front support and the seat tube. The seat tube comprises three layers for at least a portion of a top section of the seat tube.

In one example implementation, the three layers of materials include an inner layer of carbon fiber, a middle layer of aluminum (or other metal), and an outside layer of carbon fiber. Other arrangements for the three layers and more than three layers can also be used.

One embodiment includes a seat tube having a first layer and a second layer for at least a portion of the tube. The seat tube has a seat tube length. The first layer is a metal layer. The second layer is made of a different material than the first layer. The first layer extends for more than 50% of the seat tube length.

One embodiment includes a seat tube having a first layer and a second layer for at least a portion of the seat tube. The seat tube has an outer surface with respect to the first layer and the second layer. The first layer is a metal layer. The second layer is different than the first layer. The first layer provides more than 50% of the outer surface. The outer surface may also be painted or otherwise finished.

DETAILED DESCRIPTION

Figure 1:
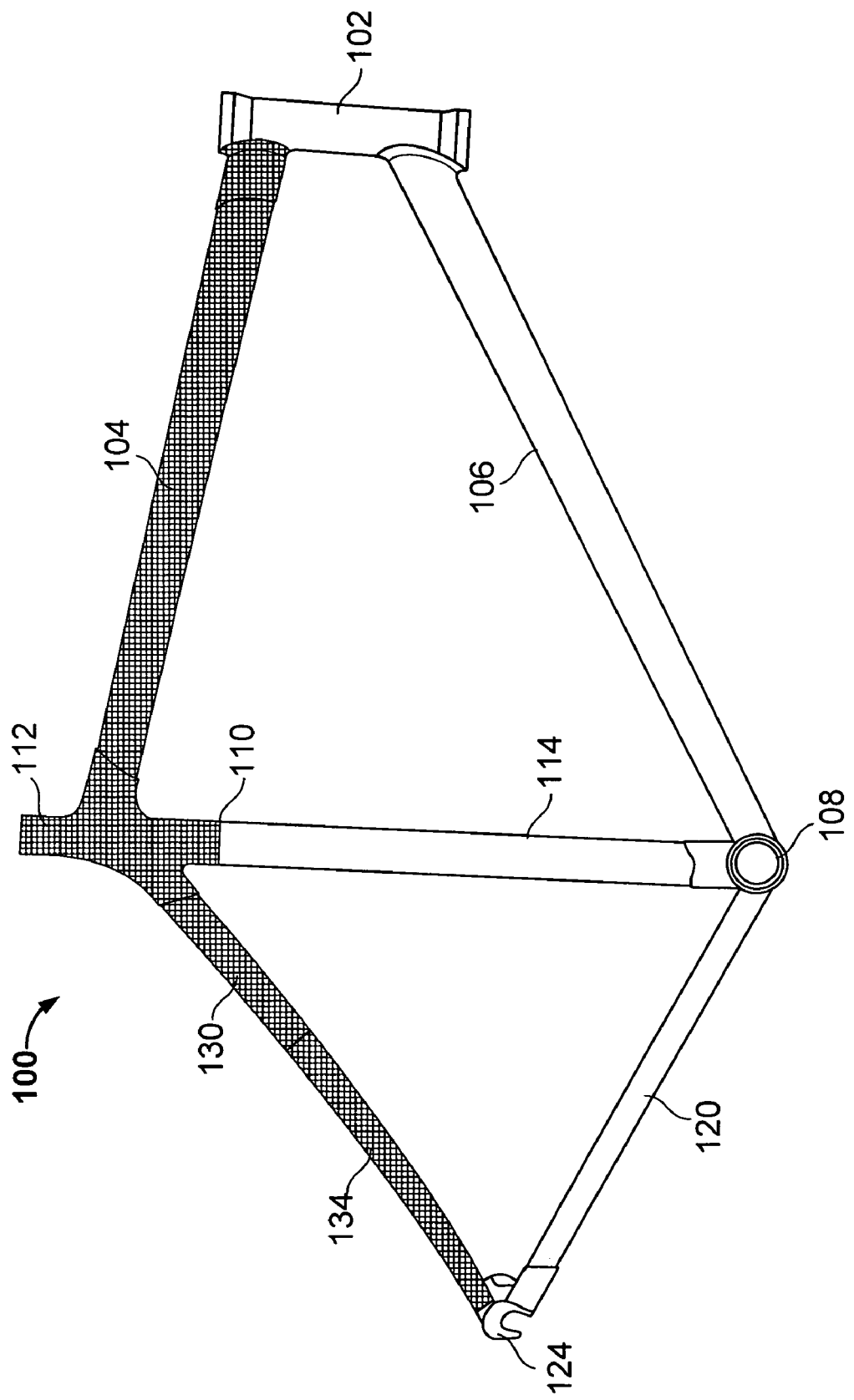
FIG. 1 is a side view of one embodiment of a bicycle frame.
Figure 2:
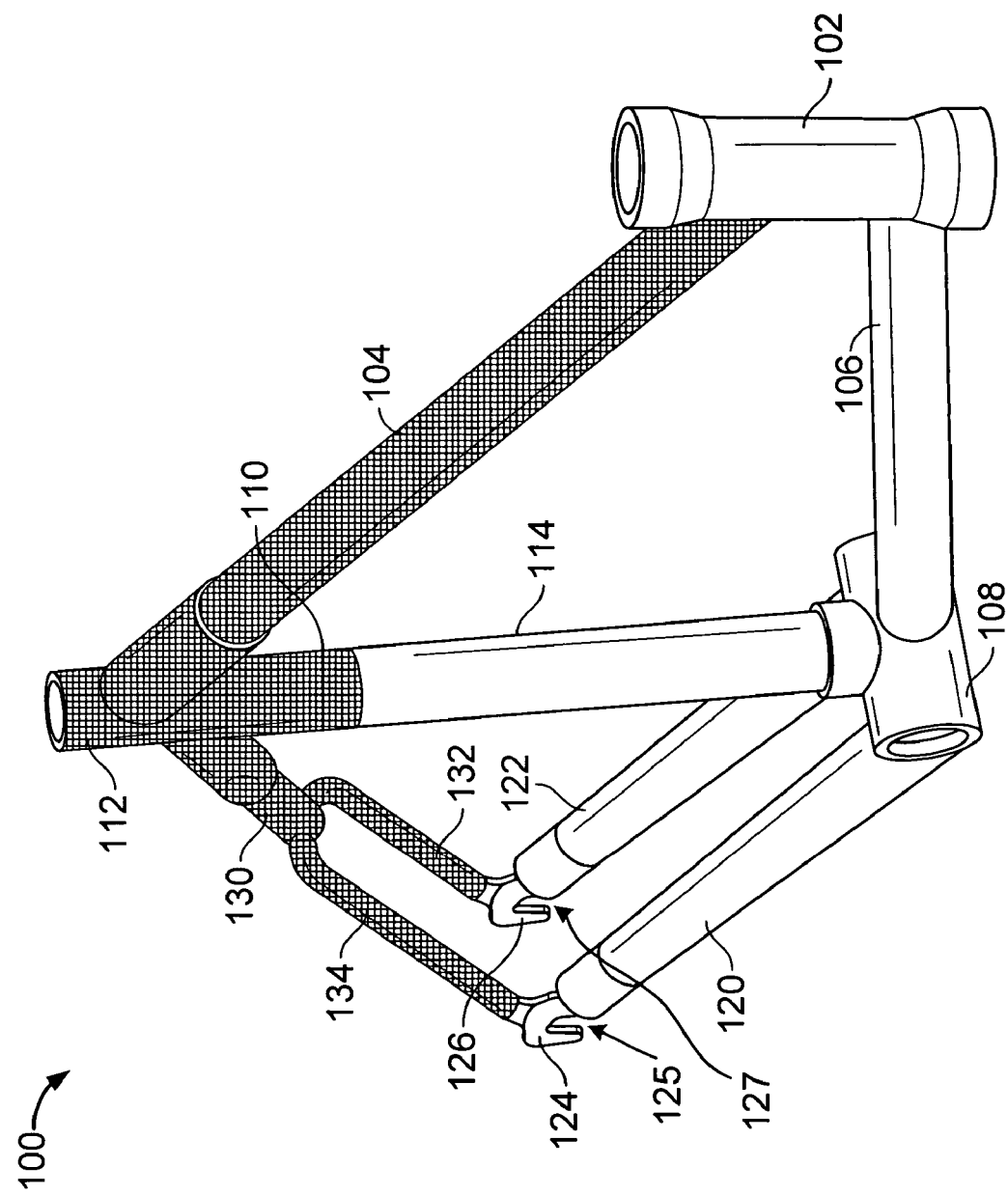
FIG. 2 is a perspective view of the bicycle frame of FIG. 1.

FIG. 1 depicts a side view of bicycle frame 100. FIG. 2 provides a prospective view of bicycle frame 100. Bicycle frame 100 includes head tube 102 at the front of bicycle frame 100, top tube 104 connected to head tube 102, and down tube 106 connected to head tube 102. Bottom bracket 108 is connected to the rearward end of down tube 106. Bicycle frame 100 also includes seat tube 110 connected to top tube 104 and bottom bracket 108. Seat tube 110 comprises a seat tube connector 112 and a seat tube cylinder 114. Although down tube 106 is depicted to be a straight tube, it can also be curved or angled. For example, the top of down tube 106 can curve away from top tube 104, while the bottom of down tube 106 can curve toward bottom bracket 108. Other tubes of bicycle frame 100 can also be curved or angled.

Bicycle frame 100 also includes chain stays 120 and 122, both of which are connected to bottom bracket 108 at the front ends of chain stays 120 and 122. Drop outs 124 and 126 are at the rear of bicycle frame 100 and are connected to the rearward ends of chain stays 120 and 122. Drop outs 124 and 126 include openings 125 and 127 for receiving the axel of a rear wheel (not shown).

Seat tube connector 112 connects to top tube 104 and seat stay tube 130. Seat stay tube 130 is also connected to seat stays 132 and 134. The bottom end of seat stay 132 is connected to drop out 126. The bottom end of seat stay 134 is connected to drop out 124.

Head tube 102 receives a front fork assembly (not shown) and steering assembly (not shown). The front fork assembly will support the front wheel.

In one embodiment, a first portion of bicycle frame 100 is made of a metal and second portion of bicycle frame 100 is made of a non-metallic material. Various different metals can be used for the first portion of the bicycle frame. In one embodiment, aluminum is used. In other embodiments, titanium or steel can be used. Other metals can also be used. The second portion of the bicycle frame can be made from a reinforced plastic composite material. One example of a suitable material for the second portion of the bicycle frame is carbon fiber. Other non-metal materials can also be used. In other embodiments, other materials can be used such that at least one portion of the bicycle is of a first material and at least a second portion of the bicycle is of a second material, where the first material is different than the second material (even if the first material and the second material include one or more common components/ingredients).

In one embodiment, head tube 102, down tube 106, bottom bracket 108, chain stay 120, chain stay 122, drop out 124 and drop out 126 are made of metal (e.g., aluminum). The metal components can be welded together, fastened in another manner, or formed as one integrated structure. Top tube 104, seat stay tube 130, seat stay 132 and seat stay 134 are made of carbon fiber. In one embodiment, the carbon fiber components are glued together. In other embodiments, other means for fastening can be used. In yet other embodiments, two or more of the carbon fiber components can be formed as one integrated structure. In other embodiments, different sets of parts can be metal and different sets of parts can be non-metal than the sets of metal and carbon fiber parts identified above.

Seat tube 110 is comprised of three layers of materials. At least one of the layers of materials comprising seat tube 110 is made of metal and a second layer is made of carbon fiber. In one embodiment, seat tube 110 includes an inner layer made of carbon fiber, middle layer made of metal (e.g., aluminum), and an outer layer made of carbon fiber. In other embodiments, the three layer[s] can be made of different materials. In some embodiments, seat tube 110 can include more than three layers.

In FIG. 1 and FIG. 2, shading is used to identify which surfaces are made of carbon fiber. Those surfaces that are shaded are made from carbon fiber, while the surfaces that are not shaded are made from metal. The shading is not meant to indicate any particular color. The carbon fiber can be painted any color. In addition, the metal components can also be painted any color.

Figure 3:
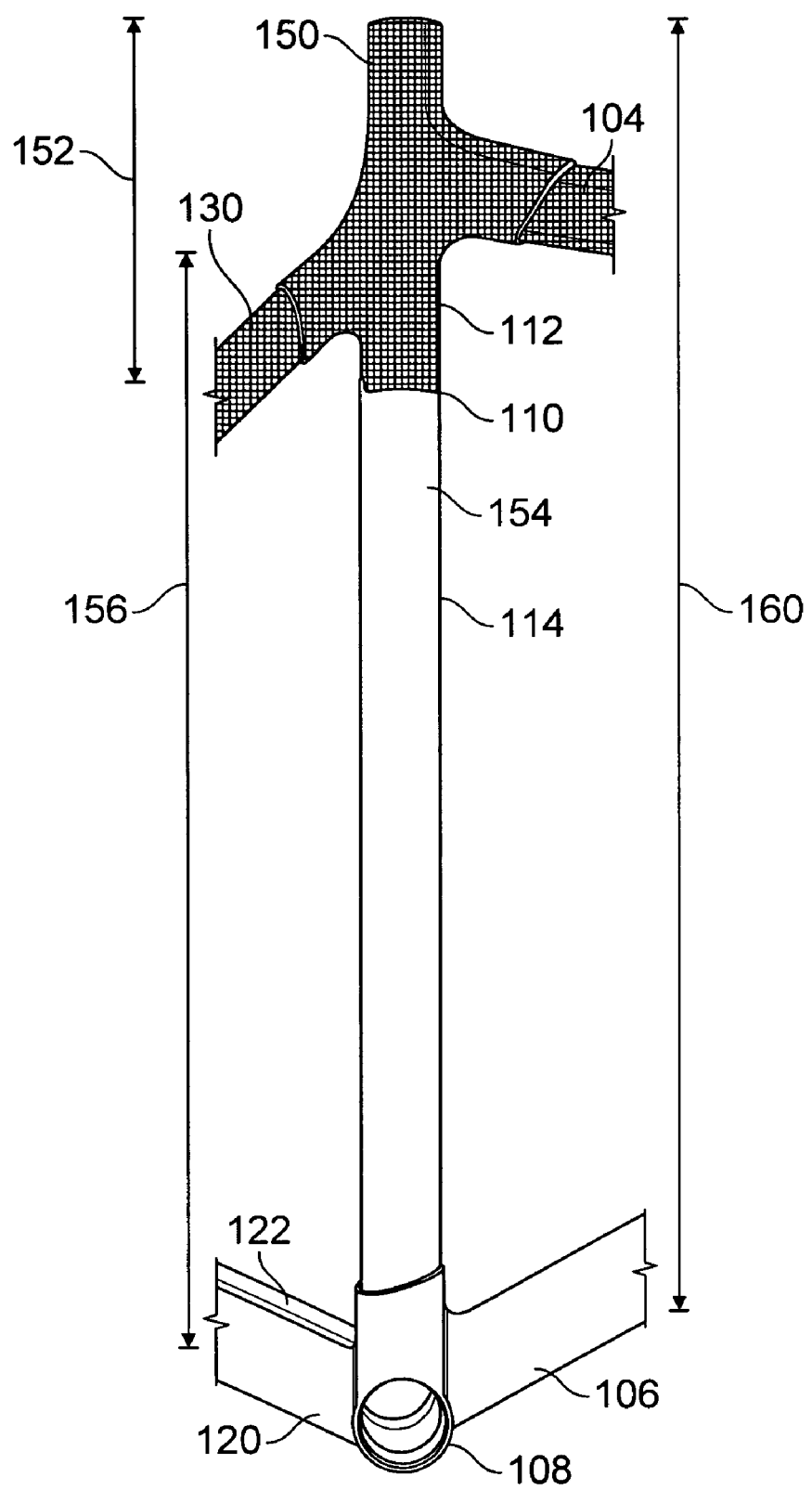
FIG. 3 depicts one embodiment of a seat tube.

FIG. 3 depicts more details of seat tube 110. As discussed above, one embodiment of seat tube 110 is comprised of three layers: an outer layer 150, a middle layer 154 and an inner layer 158. The length of outer layer 150 is indicated by arrow 152. The length of middle layer 154 is indicated by arrow 156. The length of inner layer 158 is indicated by arrow 160. In one embodiment, outer layer 150 does not cover the entire surface of seat tube 110. Rather, it only covers a portion (e.g., top portion) of seat tube 110. In one embodiment, outer layer 150 only covers seat tube connector 112. In one embodiment, middle layer 154 is not positioned along the entire length of seat tube 110. As depicted by arrow 156, middle layer 154 starts at the bottom of seat tube 110 and continues to a location near the top of seat tube 110. The outer surface of cylinder 114 is comprised of middle layer 154. Inner layer 158 starts at the top of seat tube 110 and continues until a position near the bottom of seat tube 110. The length of inner layer 158 is indicated by arrow 160. As can be seen, inner layer 158 does not extend as low as middle layer 154. The bottom of middle layer 154 and inner layer 158 are inserted in bottom bracket 108.

In one embodiment, inner layer 158 extends for approximately 95% of the length of seat tube 110, middle layer 154 extends for approximately 80% (or at least 80%) of the length of seat tube 110, and outer layer 150 extends for approximately 30% of the length of seat tube 110. These lengths can be varied. For example, in other embodiments that vary lengths, middle layer 154 can be more than 50% of the length of seat tube 110, middle layer 154 can be more than ⅔ of the length of seat tube 110, middle layer 154 can be more than 75% of the length of seat tube 110, or middle layer 154 can be more than 80% of the length of seat tube 110. In other embodiments, inner layer 158 can vary from ⅔ to 100% of the length of seat tube 110, middle layer 154 can vary from ⅔ to 100% of the length of seat tube 110, and outer layer 150 can vary from 30% to 100% of the length of seat tube 110.

In one embodiment, outer layer 150 covers approximately 30% and middle layer 154 covers 70% of the outside surface of seat tube 110 with respect to the three layers. The coverage of the outer surface of seat tube 110 can also be varied. For example, in other embodiments middle layer 154 can be configured to cover more than 50%, more than ⅔, or more than 70% of the outer surface of seat tube 110 with respect to the three layers. The lengths of the various layers, including surface coverage, are designed to optimally balance stiffness and comfort.

In some embodiments, seat tube 110 may be covered by paint and/or another finishing substance. To the extent that middle layer 154 (or another layer) is considered to cover a portion of the outer surface of seat tube 110 with respect to the three layers (or two layers), that consideration does not take into account the paint or other finishing substance. Thus, middle layer 154 is said to cover X % of the outside surface of seat tube 110 with respect to the three layers, if it is on the outside surface with respect to the three layers 150, 154 and 158, even if seat tube 110 is painted or otherwise finished to cover the outside surface.

Figure 4A:
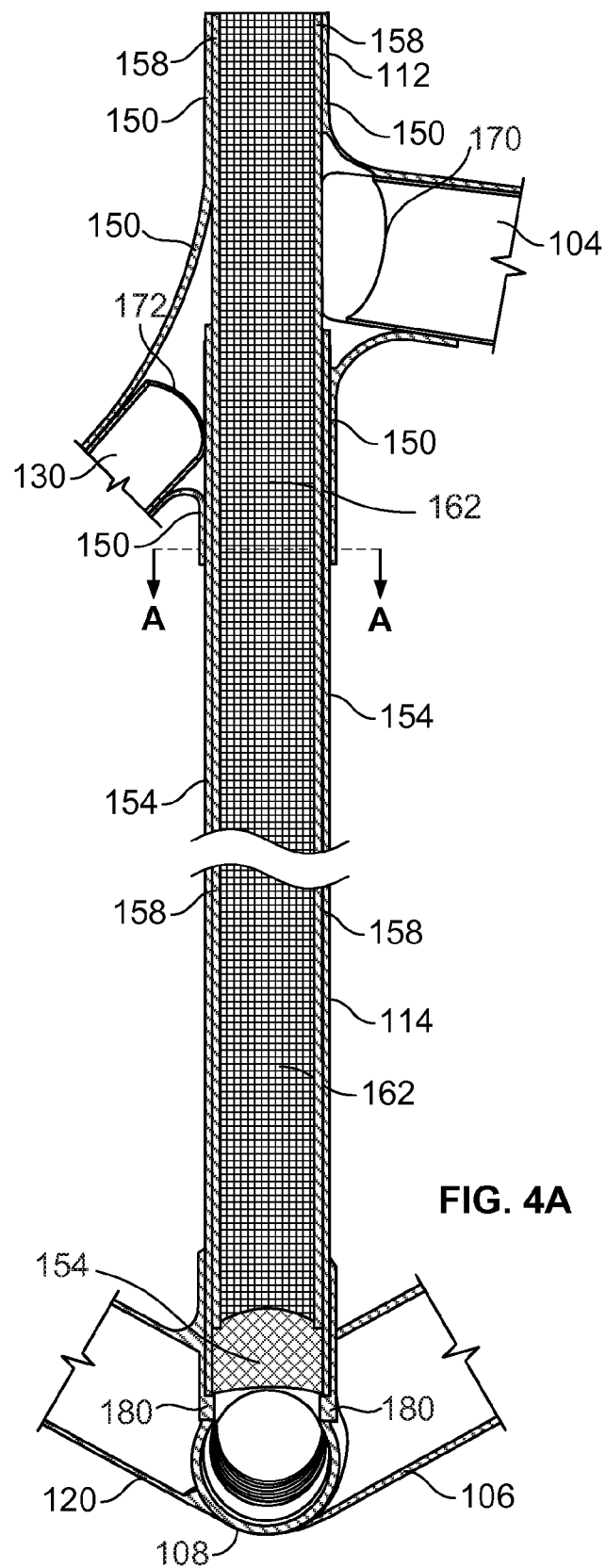
FIG. 4A is a cross section of the seat tube of FIG. 3.

FIG. 4A is a cutaway view of seat tube 110 that reveals the inside of seat tube 110. Outer layer 150 provides an outer surface for seat tube connector 112 and, therefore, for the upper portion of seat tube 110. Seat tube connector 112 receives top tube 104 inside seat tube connector 112. Top tube 104 is glued to the inside of seat tube connector 112 along line 170. Seat tube connector 112 also receives seat stay tube 130 inside seat tube connector 112. Seat stay tube 130 is glued to the inside of seat tube connector 112 along line 172. Note that FIG. 4A shows glue lines 170 and 172 as being curved; however, they can also be straight lines or other shapes. Other means for fastening can also be used. FIG. 4A shows outer layer 150 overlapping with a portion of seat tube cylinder 114. In the region where outer layer 150 overlaps with seat tube cylinder 114, middle layer 154 is under outer layer 150. In the portion of seat tube cylinder 114 not overlapped by outer layer 150, middle layer 154 provides the outside surface of seat tube 110. Middle layer 154 is in the shape of a cylinder. In some embodiments, the end portions of outer layer 150 are tapered to provide a smooth transition to middle layer 154. Inner layer 158 is inside middle layer 154. In one embodiment, inner layer 158 is in the shape of a cylinder providing an interior lining to middle layer 154. As can be send from FIG. 4A, middle layer 154 extends lower than inner layer 158. FIG. 4A also depicts the interior surface 162 of interior layer 158.

Seat tube 110 fits within bottom bracket 108. Bottom bracket 108 includes stop 180, which abuts against the bottom of middle layer 154 to properly position seat tube 110 inside bottom bracket 108. At the bottom of middle layer 154, seat tube 110 is glued to bottom bracket 108.

Figure 4B:
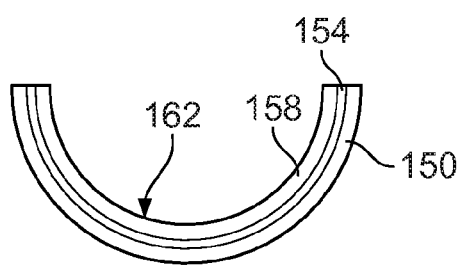
FIG. 4B is a cross section taken from FIG. 4A.

FIG. 4B is a cutaway view of seat tube 110 along dashed line AA. The three distinct layers of material 150, 154 and 158 are depicted in contact with each other. FIG. 4B also show inner surface 162 of inner layer 158.

Figure 5:
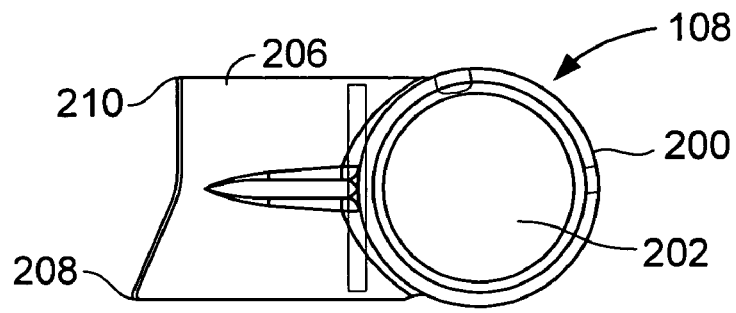
FIGS. 5-7 depict various views of one embodiment of a bottom bracket.
Figure 6:
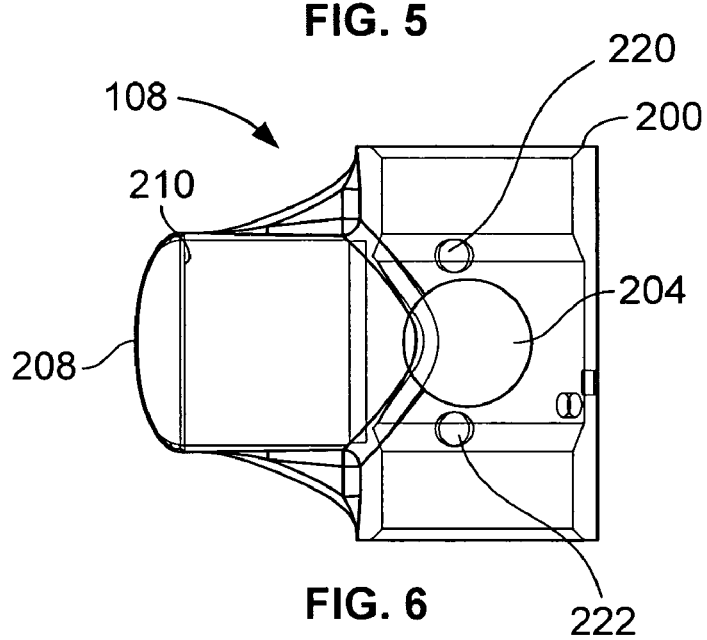
Figure 7:
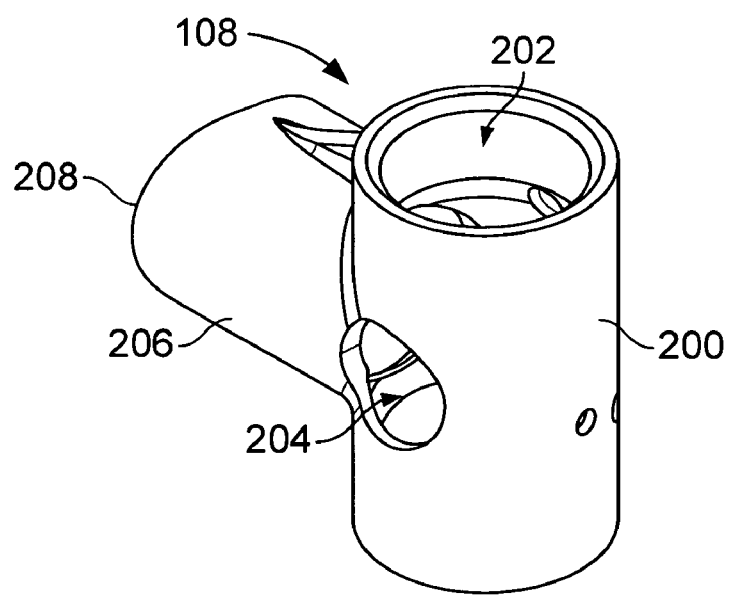
Figure 8:
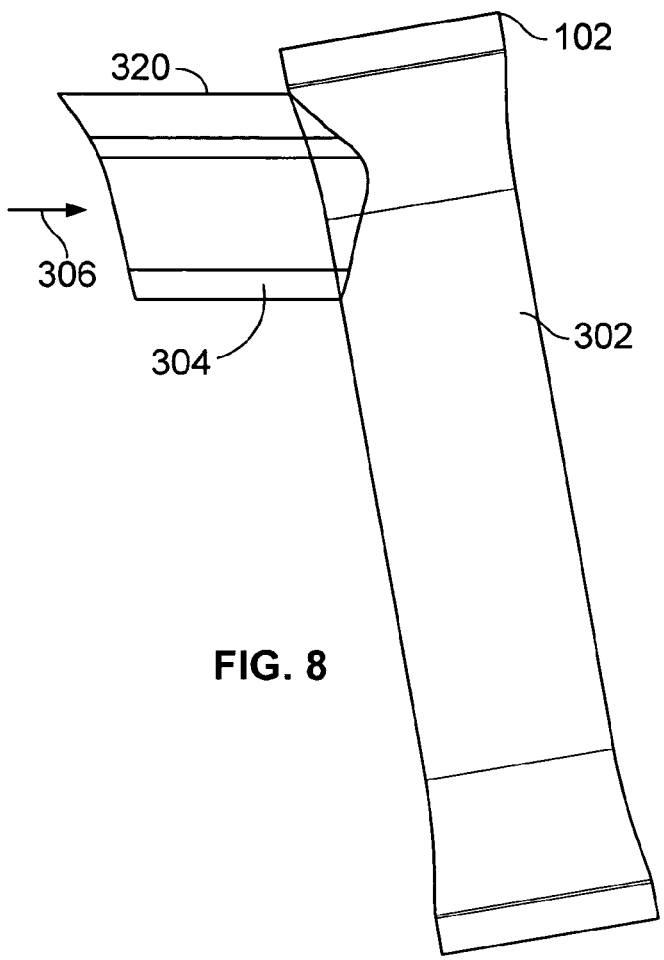
FIGS. 8-11 depict various views of one embodiment of a head tube.

FIGS. 5-7 provide various views of one embodiment of bottom bracket 108. As depicted, bottom bracket 108 includes cylinder 200, which defines an opening 202. Opening 202 receives a crank assembly. One side of cylinder 200 includes aperture 204, which defines a position for attaching (e.g., welding) down tube 106. Another side of cylinder 200 includes two smaller apertures 220 and 222 for defining positions to attach (e.g., weld) chain stay 120 and chain stay 122. Seat tube receiving cylinder 206 is mounted on cylinder 200. Seat tube 110 fits within seat tube receiving cylinder 206 so that the bottom end of middle layer 154 is positioned against (e.g., abuts) stop 180. Inner layer 158 does not abut stop 180. The edge of cylinder 206 includes a high section 208 and a low section 210.

Figure 9:
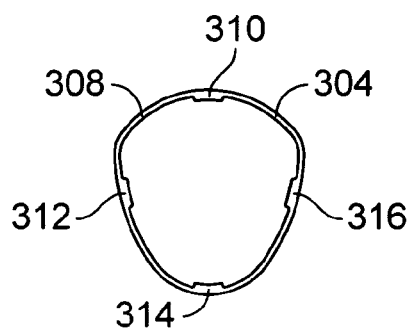

FIGS. 8-11 depict various views of one embodiment of head tube 102. As depicted, head tube 102 includes main tube 302 and top tube receiving section 304. A portion of top tube receiving section 304 fits within an opening of main tube 302 and can be glued or welded therein. FIG. 9 provides a view looking into top tube receiving section 304, as defined by arrow 306. Section 304 includes a shell 308 with stops 310, 312, 314, and 316 that protrude from the interior surface of shell 308.

Figure 10:
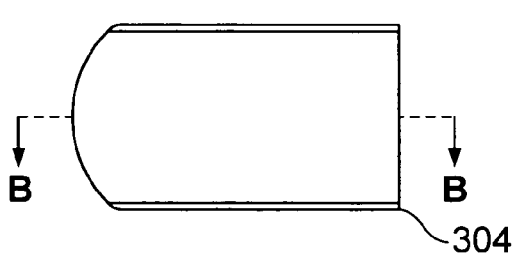
Figure 11:
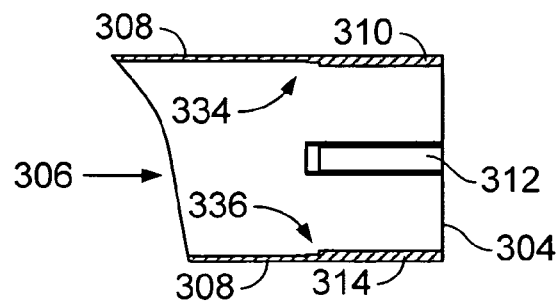

FIG. 10 provides a top view of top tube receiving section 304, looking down on top surface 320 of top tube receiving section 304. FIG. 11 provides a cutaway view of top tube receiving section 304 cut along dashed line BB of FIG. 10. Top tube 104 fits within shell 308. The front end portion of top tube 104 is in contact with stops 310, 312, 314, and 316. As can be seen in FIG. 11, stops 310-316 create ridges. For example, FIG. 11 shows ridge 334 created by stop 310 and ridge 336 created by stop 314. The front end of top tube 104 butts against these ridges. In one embodiment, the top tube 104 is glued to receiving section 304 at or near the ridges, or in another location within receiving section 304.

The above-described bicycle frame includes an optimal design for seat tube 110. Inner layer 158 and middle layer 154 provide a good balance between comfort (e.g., from carbon fiber) and rigidity (e.g., from aluminum). Aluminum and carbon fiber material have different elasticity. Use of the outer layer 150 will add strength in light of the difference in electricity.

Figure 12:
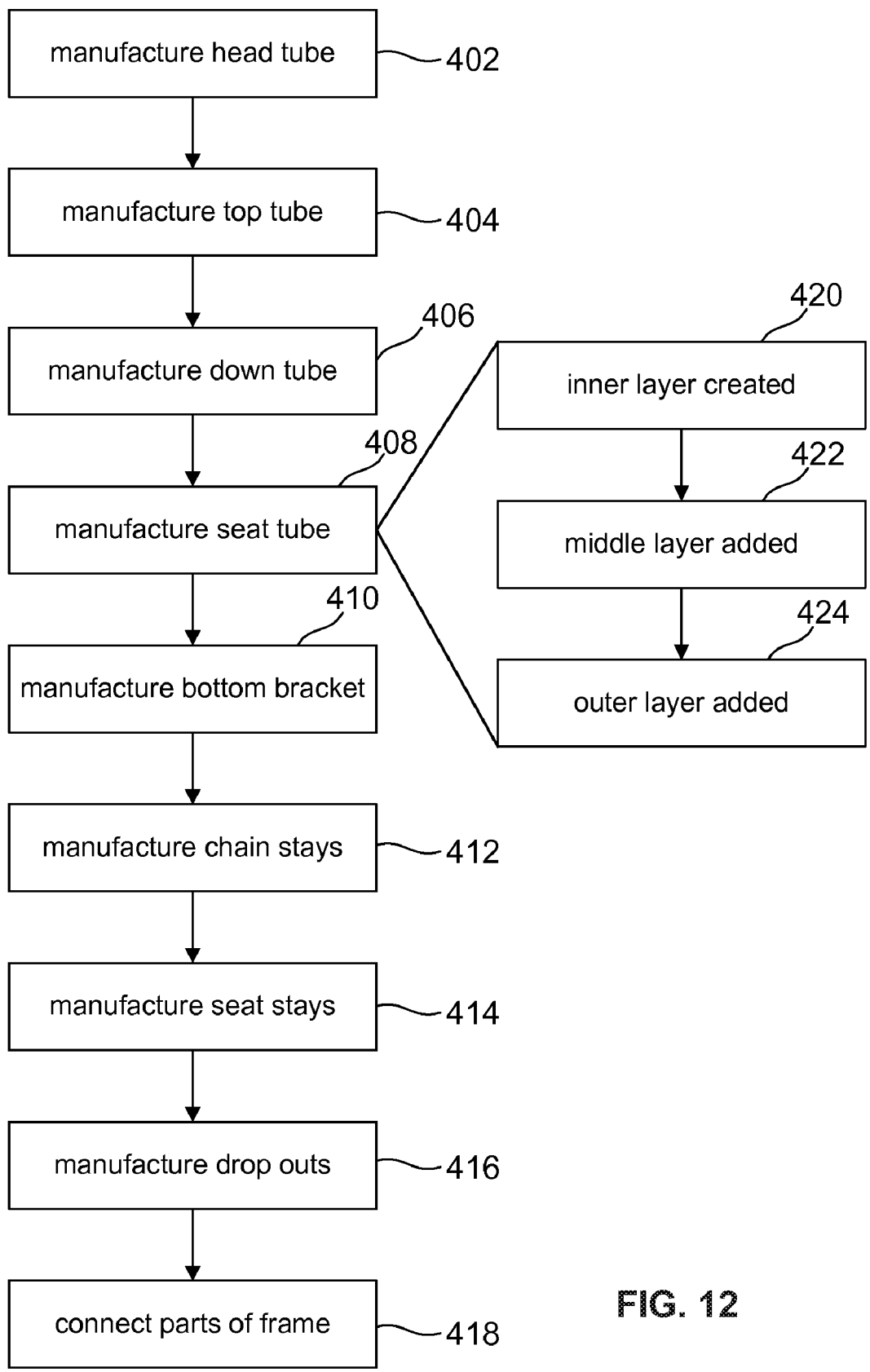
FIG. 12 is a flow chart describing a process for manufacturing a bicycle frame.

FIG. 12 is a flow chart describing one embodiment of a process for making a bicycle frame with the features described above. In step 402, head tube 102 is manufactured. In step 404, top tube 104 is manufactured. In step 406, down tube 106 is manufactured. In step 408, seat tube 110 is manufactured. In step 410, bottom bracket 108 is manufactured. In step 412, chain stays 120 and 122 are manufactured. In step 414, seat stays 132 and 134, as well as seat tube 110, are manufactured. In step 416, drop outs 124 and 126 are manufactured.

In step 418, the parts of the frame manufactured in steps 402-416 are connected together. For example, top tube 104 and seat stay tube 130 are glued to seat tube connector 112. Top tube 104 is glued to head tube 102. Seat tube cylinder 114 is glued to bottom bracket 108. Down tube 106 is welded to head tube 102 and bottom bracket 108. Chain stay 120 and chain stay 122 are also welded to bottom bracket 108. Seat stay 132 and seat stay 134 are glued to seat stay tube 130 and dropouts 124 and 126. Chain stay 120 and chain stay 122 are welded to drop outs 124 and 126.

FIG. 12 shows that the step of manufacturing seat tube 110 includes three steps. In step 420, inner layer 158 is created. In step 422, middle layer 154 is added to seat tube 110. In step 424, outer layer 150 is added to seat tube 110. Note that the order for performing steps 402-424 can be varied from the order depicted in FIG. 12.

Instead of making the carbon fiber components separately and then connecting them together, all or a subset of the carbon fiber tubes can be made concurrently and/or integrally as a one-piece structure. For example, a pattern of directional layers of carbon fiber material can be impregnated with epoxy and placed in a mold with a bladder. The bladder is connected to pressurized air fittings. The mold is in the shape of the top tube, seat tube and seat stay structure (e.g., seat stay tube and two seat stays). The mold is then placed in an oven where a high temperature allows the epoxy to become liquid and intermingle with the carbon fibers. After sufficient heating, the mold is allowed to cool and the epoxy is cured so that a one-piece structure is created for the top tube, seat tube and seat stay structure. Thus, the tubes are made and connected at the same time.

Before placing the mold into the oven, carbon fiber impregnated with epoxy for the inner layer 158 is inserted into an aluminum tube. The aluminum tube is middle layer 154. Carbon fiber impregnated with epoxy for upper layer 150 is then wrapped around the aluminum tube. The seat stay is then positioned adjacent to the top tube and seat stay structure. When heated in the oven, the epoxy from the two carbon fiber layers will cause the carbon fiber layers to bond with the aluminum layer and the adjacent parts.

In one embodiment, the head tube, down tube, bottom bracket and chain stays are welded, aligned, heat treated and precision machined as a single aluminum structure. This aluminum structure can be treated with a non-oxidizing coating. In some embodiments, rather than gluing the aluminum structure to the carbon fiber structure, the aluminum structure can be placed in position against the appropriate parts of the carbon fiber structure and a carbon fiber laminate layer can be wrapped around the joint between the carbon fiber structure and the aluminum structure. These joints with carbon fiber laminate are inserted into the mold and heated to bond the aluminum structure to the carbon fiber structure. Other technologies for combining the structures can also be used.

The above-described frame design that utilizes a combination of metal and carbon fiber provides an optimal combination to balance stiffness and comfort. The metal down tube, chain stays and bottom bracket provide stiffness. The carbon fiber top tube and seat stays provide comfort. The carbon fiber materials are also light weight. The improved seat tube is provided with stiffness by the middle aluminum layer and comfort by the inner carbon fiber layer. Because the middle aluminum layer is longer than in prior combination frames and occupies a greater percentage of the length of the seat tube than in prior combination frames, the middle aluminum layer provides for a stiffer seat tube. The stiffer seat tube enables better power efficiency and corner acceleration, as well as better riding control when going downhill. The longer and overlapping inner carbon fiber layer balances the aluminum layer by absorbing vibration and increasing comfort.

The outer layer of the seat tube helps prevent cracking of the frame. If the seat tube only includes the middle metal layer and the inner carbon fiber layer, then there is a possibility that there could be a crack at the upper junction of the seat tube with the other components of the frame due to shear stress concentrated on the junction. By covering the junction with the outer carbon fiber layer and overlapping the three layers, the stress can be dispersed to avoid the cracking at the junction area.

The compact frame design described above produces a lighter and stiffer bike than standard bicycle frame geometry. The sloping top tube uses less material and creates a smaller rear triangle, which minimizes flex under acceleration, descending and cornering.

The technology for using three layers to form a seat tube can also be used to make other portions of the bicycle frame.

For example, the down tube, top tube, head tube or other portions of the frame can also comprise three layers or more than three layers.

The foregoing detailed description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. A bicycle frame comprising a plurality of tubes connected together; at least a portion of a first tube of said plurality of tubes comprises at least three distinct layers of materials; at least a majority of said first tube includes at least two of said three distinct layers of materials; said three distinct layers include an inner layer, a middle layer and an outer layer; said middle layer comprises a metal material; and said inner layer and said outer layer comprise different material than said middle layer; said first tube comprises a seat tube; a portion of said seat tube that receives a seat assembly includes said inner layer and said outer layer without including said middle layer.

2. The bicycle frame according to claim 1, wherein:
said inner layer comprises carbon fiber and said outer layer comprises carbon fiber.

3. The bicycle frame according to claim 1, wherein:
said middle layer extends for more than 50% of an outer surface with respect to said three distinct layers.

4. The bicycle frame according to claim 1, wherein: said seat tube has an outer surface; and more than half of said outer surface is formed by said middle layer.

5. The bicycle frame according to claim 1, wherein:
said inner layer, said middle layer and said outer layer have concentric tubular portions.

6. The bicycle frame according to claim 1, wherein:
said inner layer, said middle layer and said outer layer have tubular portions with overlapping lengths.

7. The bicycle frame according to claim 1, wherein:
said inner layer includes a first tubular portion;
said middle layer includes a second tubular portion;
and said outer layer includes a third tubular portion;
said first tubular portion is in contact with said second tubular portion along a length of said first tubular portion and a length of said second tubular portion; and
said third tubular portion is in contact with said second tubular portion along a length of said third tubular portion and said length of said second tubular portion.

8. A bicycle frame, comprising:
a seat tube having a top section and a bottom section, said top section having three distinct layers for at least a first portion of said top section, at least a majority of said seat tube includes at least two of said three distinct layers;
a front support; and
a cross support connected to said front support and said seat tube;
wherein said three distinct layers include an inner layer comprising carbon fiber, a middle layer comprising a metal material and an outer layer comprising carbon fiber, a portion of said seat tube that receives a seat assembly includes said inner layer and said outer layer without including said middle layer.

9. The bicycle frame according to claim 8, further comprising:
a bottom bracket connected to said bottom section of said seat tube, said front support is a head tube, said cross support is a top tube; and
a down tube connected to said head tube and said bottom bracket, said top section of said seat tube is connected to said top tube.

10. The bicycle frame according to claim 9, wherein:
said middle layer is in contact with said bottom bracket; and
said inner layer is not in contact with said bottom bracket.

11. The bicycle frame according to claim 9, wherein:
said middle layer is in contact with said bottom bracket; and
said outer layer is not in contact with said bottom bracket.

12. The bicycle frame according to claim 9, wherein:
said inner layer has a first length;
said middle layer has a second length different than said first length; and
said outer layer has a third length, said third length is shorter than said first length and said second length.

13. The bicycle frame according to claim 9, wherein:
said top tube is made of carbon fiber;
said head tube and said down tube are made of metal;
said bicycle frame further includes seat stays and chain stays connected to said seat stays;
said seat stays are made of carbon fiber; and
said chain stays are made of metal.

14. The bicycle frame according to claim 8, wherein:
said inner layer, said middle layer and said outer layer have concentric tubular portions.

15. The bicycle frame according to claim 8, wherein:
said inner layer, said middle layer and said outer layer have tubular portions with overlapping lengths.

16. The bicycle frame according to claim 8, wherein:
said inner layer, said middle layer and said outer layer are part of a common tubular shape.

17. The bicycle frame according to claim 8, wherein:
said inner layer includes a first tubular portion;
said middle layer includes a second tubular portion;
said outer layer includes a third tubular portion;
said first tubular portion is in contact with said second tubular portion along a length of said first tubular portion and a length of said second tubular portion; and
said third tubular portion is in contact with said second tubular portion along a length of said third tubular portion and said length of said second tubular portion.

18. A bicycle frame, comprising:
a seat tube having a top section and a bottom section, said top section having three distinct layers for at least a first portion of said top section, said seat tube has an outside surface with respect to said three distinct layers;
a front support;
a cross support connected to said front support and said seat tube, said three distinct layers include an inner layer, a middle metal layer and an outer layer, more than half of said outside surface is formed by said middle metal layer, at least a majority of said seat tube includes at least two of said three distinct layers;
a bottom bracket connected to said bottom section of said seat tube, said front support is a head tube, said cross support is a top tube, said middle layer is in contact with said bottom bracket, said inner layer is not in contact with said bottom bracket; and a down tube connected to said head tube and said bottom bracket, said top section of said seat tube is connected to said top tube.

19. A bicycle frame, comprising:
a seat tube having a top section and a bottom section, said top section having three distinct layers for at least a first portion of said top section, said seat tube has a length;
a front support;
a cross support connected to said front support and said seat tube, said three distinct layers include an inner layer, a middle metal layer and an outer layer; said middle metal layer extends for more than half of said length, at least a majority of said seat tube includes at least two of said three distinct layers;
a bottom bracket connected to said bottom section of said seat tube, said front support is a head tube, said cross support is a top tube; and
a down tube connected to said head tube and said bottom bracket, said top section of said seat tube is connected to said top tube;
wherein said inner layer has a first length, said middle layer has a second length different than said first length, said outer layer has a third length, said third length is shorter than said first length and said second length.

20. A bicycle frame, comprising:
a seat tube having a first layer and a second layer for at least a portion of said seat tube, said seat tube having a seat tube length, said seat tube has a third layer for a top section of said seat tube, said third layer is outside of said first layer, a segment of said top section of said seat tube that receives a seat assembly includes said second layer and said third layer without including said first layer, said first layer is a metal layer, said second layer is different than said first layer, said first layer extends for more than 50% of said seat tube length, said second layer includes carbon fiber, said second layer is inside said first layer, said second layer extends for more than 50% of said seat tube length;
a front support; and
a cross support connected to said front support and said seat tube.

21. The bicycle frame according to claim 20, wherein:
said first layer extends for more than ⅔ of said seat tube length.

22. The bicycle frame according to claim 20, wherein:
said first layer extends for at least 80% of said seat tube length.

23. The bicycle frame according to claim 20, further comprising:
a bottom bracket, said front support is a head tube, said cross support is a top tube;
a metal down tube connected to said head tube and said bottom bracket, said head tube is comprised of metal, said top tube is comprised of carbon fiber;
two carbon fiber seat stays; and
two metal chain stays connected to said seat stays and said bottom bracket.

24. The bicycle frame according to claim 20, wherein:
said first layer, said second layer and said third layer have concentric tubular portions.

25. The bicycle frame according to claim 20, wherein:
said first layer, said second layer and said third layer are part of a common tubular shape.

26. A bicycle frame, comprising:
a seat tube having a first layer and a second layer for at least a portion of said seat tube, said seat tube has an outer surface with respect to said first layer and said second layer, said first layer is a metal layer, said second layer is different than said first layer, said first layer provides more than 50% of said outer surface, said second layer is inside said first layer for more than 50% of a length of the seat tube;
a head tube;
a top tube connected to said head tube and said seat tube; and
a bottom bracket, said first layer is in contact with said bottom bracket, said second layer is not in contact with said bottom bracket.

27. The bicycle frame according to claim 26, wherein:
said first layer extends for more than ⅔ of said outer surface.

28. The bicycle frame according to claim 26, wherein:
said first layer extends for more than 70% of said outer surface; and
said first layer extends for more than 90% of said seat tube.

29. The bicycle frame according to claim 28, wherein:
said second layer includes carbon fiber.

* * * * *

UNITED STATES PATENT AND TRADEMARK OFFICE
CERTIFICATE OF CORRECTION

PATENT NO. : 7,597,338 B2  Page 1 of 1
APPLICATION NO. : 11/213272
DATED : October 6, 2009
INVENTOR(S) : I et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 690 days.

Signed and Sealed this

Twenty-eighth Day of September, 2010

David J. Kappos
*Director of the United States Patent and Trademark Office*